United States Patent
Tsui

(10) Patent No.: US 12,425,397 B2
(45) Date of Patent: Sep. 23, 2025

(54) DISPLAY SYSTEM AND OPERATION METHOD THEREOF

(71) Applicant: Optoma Corporation, New Taipei (TW)

(72) Inventor: Yuan-Mao Tsui, New Taipei (TW)

(73) Assignee: Optoma Corporation, New Taipei (TW)

( * ) Notice: Subject to any disclaimer, the term of this patent is extended or adjusted under 35 U.S.C. 154(b) by 153 days.

(21) Appl. No.: 17/991,825

(22) Filed: Nov. 21, 2022

(65) Prior Publication Data

US 2023/0171247 A1 Jun. 1, 2023

(30) Foreign Application Priority Data

Nov. 26, 2021 (CN) .......................... 202111420738.X

(51) Int. Cl.
*H04L 9/40* (2022.01)
*G06V 40/12* (2022.01)

(52) U.S. Cl.
CPC ...... *H04L 63/0861* (2013.01); *G06V 40/1365* (2022.01)

(58) Field of Classification Search
CPC .......................... H04L 63/0861; G06V 40/1365
See application file for complete search history.

(56) References Cited

U.S. PATENT DOCUMENTS

| | | | |
|---|---|---|---|
| 7,107,245 B1* | 9/2006 | Kowalick | G06Q 20/10 713/184 |
| 8,374,324 B2* | 2/2013 | Suryanarayana | H04M 1/247 348/14.05 |
| 8,627,095 B2* | 1/2014 | Asano | G06F 21/32 726/19 |

(Continued)

FOREIGN PATENT DOCUMENTS

| | | |
|---|---|---|
| CN | 103686274 | 3/2014 |
| CN | 106162280 | 11/2016 |

(Continued)

OTHER PUBLICATIONS

"Office Action of China Counterpart Application", issued on Apr. 24, 2025, p. 1-p. 7.

*Primary Examiner* — Ghodrat Jamshidi
(74) *Attorney, Agent, or Firm* — JCIPRNET

(57) ABSTRACT

A display system and an operation method thereof are provided. The display system includes a display device and a remote control device. The display device includes a control unit and a biometric characteristic management unit. The control unit is coupled to the biometric characteristic management unit. The remote control device includes a biometric characteristic sensor and is connected to the display device via wireless communication. The biometric characteristic sensor of the remote control device obtains biometric characteristic data. The remote control device transmits the biometric characteristic data to the display device, so that the biometric characteristic management unit (Continued)

of the display device compares the biometric characteristic data with a biometric characteristic registration database to determine whether the control unit automatically executes an application program.

18 Claims, 5 Drawing Sheets

(56) References Cited

U.S. PATENT DOCUMENTS

| | | | |
|---|---|---|---|
| 8,988,192 B2* | 3/2015 | King | G06F 21/32 |
| | | | 340/5.82 |
| 10,737,180 B1* | 8/2020 | Noland | A63F 13/847 |
| 11,409,851 B2* | 8/2022 | Lu | G06F 21/84 |
| 11,699,446 B2* | 7/2023 | Tan | G10L 17/18 |
| | | | 704/243 |
| 2009/0128392 A1* | 5/2009 | Hardacker | H04L 63/0492 |
| | | | 341/175 |
| 2013/0027193 A1* | 1/2013 | Dai | G08C 17/02 |
| | | | 340/12.22 |
| 2015/0163219 A1* | 6/2015 | Lo | H04L 63/0861 |
| | | | 726/7 |
| 2015/0194134 A1* | 7/2015 | Dureau | G01B 11/026 |
| | | | 345/660 |
| 2016/0029077 A1* | 1/2016 | Shin | G06F 3/048 |
| | | | 725/25 |
| 2016/0065558 A1* | 3/2016 | Suresh | G06F 21/32 |
| | | | 726/7 |
| 2018/0211219 A1* | 7/2018 | Scott | G06Q 10/047 |
| 2019/0281049 A1* | 9/2019 | Scheller | H04L 63/0861 |
| 2021/0021594 A1* | 1/2021 | Guim Bernat | H04L 63/105 |
| 2021/0337261 A1* | 10/2021 | Kwag | H04N 21/4751 |
| 2022/0375475 A1* | 11/2022 | Tan | G10L 17/02 |
| 2023/0115126 A1* | 4/2023 | Nagashima | H04N 1/4426 |
| | | | 358/1.13 |
| 2024/0292049 A1* | 8/2024 | Bergkvist | G06F 3/0346 |

FOREIGN PATENT DOCUMENTS

| | | |
|---|---|---|
| CN | 106200247 | 12/2016 |
| CN | 109478213 | 3/2019 |
| CN | 109923544 | 6/2019 |

* cited by examiner

DISPLAY SYSTEM AND OPERATION METHOD THEREOF

CROSS-REFERENCE TO RELATED APPLICATION

This application claims the priority benefit of China application serial no. 202111420738.X, filed on Nov. 26, 2021. The entirety of the above-mentioned patent application is hereby incorporated by reference herein and made a part of this specification.

BACKGROUND

Technical Field

The disclosure relates to a system, and in particular to a display system and an operation method thereof.

Description of Related Art

As smart display apparatuses become increasingly popular, the settings and applications on a smart display apparatus are being designed for more and more accounts and personalized needs. In this regard, the current smart display apparatus has not yet been equipped with product development and design which enable quick login to a personalized system through biometric technology. The user needs to operate the display apparatus at close range and enter the password for the display apparatus to start the personalized settings and enable specific application functions of the current smart display apparatus. Therefore, the current smart display apparatus has the problems of inconvenience and poor user experience in terms of accessing personalized settings and enabling specific application functions.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a display system and an operation method thereof, which provide convenient display system operation functions.

Other objectives and advantages of the disclosure may be further understood from the technical features disclosed in the disclosure.

In order to achieve one or part or all of the above-mentioned objectives or other objectives, a display system of the disclosure includes a display device and a remote control device. The display device includes a control unit and a biometric characteristic management unit. The control unit is coupled to the biometric characteristic management unit. The remote-control device includes a biometric characteristic sensor and is connected to the display device via wireless communication. The biometric characteristic sensor of the remote-control device obtains biometric characteristic data. The remote-control device transmits the biometric characteristic data to the display device, so that the biometric characteristic management unit of the display device compares the biometric characteristic data with a biometric characteristic registration database to determine whether the control unit automatically executes an application program.

In an embodiment of the disclosure, when the display device receives the biometric characteristic data, the control unit enables the application program, and when the biometric characteristic data pass the comparison, the biometric characteristic management unit queries the biometric characteristic registration database according to the biometric characteristic data to obtain account information corresponding to the biometric characteristic data. The control unit determines whether to automatically execute a specific operation of the application program according to the account information.

In an embodiment of the disclosure, the specific operation is an application program login operation or a system setting operation.

In an embodiment of the disclosure, when the account information of the biometric characteristic data is bound to the application program, the control unit automatically executes the specific operation of the application program according to the account information. When the account information of the biometric characteristic data is not bound to the application program, the control unit operates the display device to display a system setting screen or a login screen.

In an embodiment of the disclosure, the control unit presets and executes the application program to establish a user account, and receives a biometric characteristic information list provided by the biometric characteristic management unit. The control unit binds biometric characteristic registration data to the specific operation of the application program according to a selection result of the biometric characteristic information list.

In an embodiment of the disclosure, the biometric characteristic registration database is stored in a cloud server, and the display device is connected to the cloud server via wireless communication to access the biometric characteristic registration database.

In an embodiment of the disclosure, the display device further includes a storage unit, and the storage unit is coupled to the control unit and the biometric characteristic management unit, and stores the biometric characteristic registration database.

In an embodiment of the disclosure, before the display device receives the biometric characteristic data, the display device operates in a shutdown mode, a standby mode, or an awaiting login mode.

In an embodiment of the disclosure, the remote-control device first encrypts the biometric characteristic data, and then transmits the biometric characteristic data that are encrypted to the display device.

In an embodiment of the disclosure, the display device is a projector, a TV, or a touch display, and the biometric characteristic data are fingerprint characteristic data.

In order to achieve one or part or all of the objectives or other objectives, an operation method of the disclosure is adapted for a display system. The display system includes a display device and a remote-control device. The display device includes a control unit and a biometric characteristic management unit. The remote-control device includes a biometric characteristic sensor. The operation method includes the following. Biometric characteristic data are obtained through the biometric characteristic sensor of the remote-control device. The biometric characteristic data are transmitted to the display device through the remote-control device. The biometric characteristic data are compared with a biometric characteristic registration database through the biometric characteristic management unit of the display device to determine whether the control unit automatically executes an application program.

In an embodiment of the disclosure, comparing the biometric characteristic data with the biometric characteristic registration database to determine whether to automatically execute the application program includes the following. The application program is enabled through the control unit when the display device receives the biometric characteristic data. The biometric characteristic registration database is queried through the biometric characteristic management unit according to the biometric characteristic data when the biometric characteristic data comparison succeed, and to obtain account information corresponding to the biometric characteristic data. Whether to automatically execute a specific operation of the application program is determined according to the account information through the control unit.

In an embodiment of the disclosure, the specific operation is an application program login operation or a system setting operation.

In an embodiment of the disclosure, determining whether to automatically execute the specific operation of the application program according to the account information through the control unit includes the following. The specific operation of the application program is automatically executed according to the account information through the control unit when the account information of the biometric characteristic data are bound to the application program. The display device is operated through the control unit to display a system setting screen or a login screen when the account information of the biometric characteristic data are not bound to the application program.

In an embodiment of the disclosure, the above-mentioned operation method further includes the following. The application program is preset and executed through the control unit to create a user account. A biometric characteristic information list provided by the biometric characteristic management unit is received through the control unit. Biometric characteristic registration data are bound to the specific operation of the application program according to a selection result of the biometric characteristic information list through the control unit.

In an embodiment of the disclosure, the biometric characteristic registration database is stored in a cloud server, and the display device is connected to the cloud server via wireless communication to access the biometric characteristic registration database.

In an embodiment of the disclosure, the display device further includes a storage unit, and the storage unit is coupled to the control unit and the biometric characteristic management unit, and stores the biometric characteristic registration database.

In an embodiment of the disclosure, before the display device receives the biometric characteristic data, the display device is operated in a shutdown mode, a standby mode, or an awaiting login mode.

In an embodiment of the disclosure, the remote-control device first encrypts the biometric characteristic data, and then transmits the biometric characteristic data that are encrypted to the display device.

In an embodiment of the disclosure, the display device is a projector, and the biometric characteristic data are fingerprint characteristic data.

In an embodiment of the disclosure, the display device is a display, a TV, or an interactive touch screen, and the biometric characteristic data are fingerprint characteristic data.

Based on the above, the display device and the operation method thereof of the disclosure allow the user to remotely control the display device through a remote-control device with biometric sensing function, and when the biometric comparison is successful, the display device automatically performs the specific operation of the corresponding application program.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
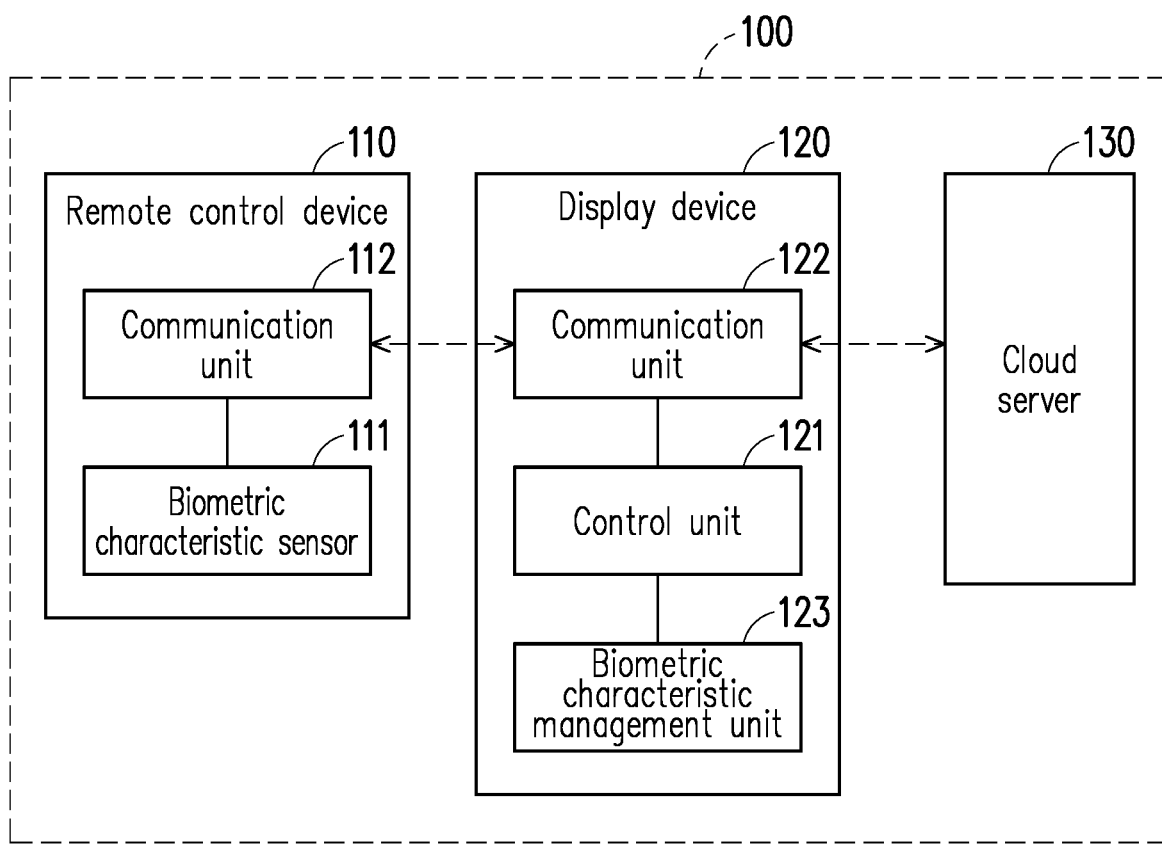
FIG. 1 is a schematic diagram of a display system according to an embodiment of the disclosure.

FIG. 1 is a schematic diagram of a display system according to an embodiment of the disclosure. Referring to FIG. 1, a display system 100 includes a remote-control device 110 and a display device 120. The remote-control device 110 includes a biometric characteristic sensor 111 and a communication unit 112. The biometric characteristic sensor 111 is coupled to the communication unit 112. The display device 120 includes a control unit 121, a communication unit 122, and a biometric characteristic management unit 123. The control unit 121 is coupled to the communication unit 122 and the biometric characteristic management unit 123. In this embodiment, the remote-control device 110 may be connected to the communication unit 122 of the display device 120 through the communication unit 112 via wireless communication, so that the user may realize remote-control of the display device 120 by operating the remote-control device 110.

In this embodiment, the biometric characteristic sensor 111 may be a fingerprint sensor, but the disclosure is not limited thereto. In an embodiment, the biometric characteristic sensor 111 may also be, for example, a sensor for collecting biometric characteristic data such as palmprint features, iris features, facial features, or voiceprint features of the user. In this embodiment, the display device 120 may be a projector, but the disclosure is not limited thereto. In an embodiment, the display device 120 may also be, for example, a touch-sensitive display, a TV, a display, an interactive flat panel (IFP), or other types of interactive display apparatuses. In this embodiment, the control unit 121 may be a microcontroller or a processor. The communication unit 112 of the remote-control device 110 and the communication unit 122 of the display device 120 may, for example, include a WiFi communication interface or a Bluetooth communication interface to realize the wireless communication function. In this embodiment, the biometric characteristic management unit 123 may be a processing circuit, a processing chip, or a software program stored in a storage unit for performing biometric analysis functions, and the disclosure is not limited thereto.

Figure 2:
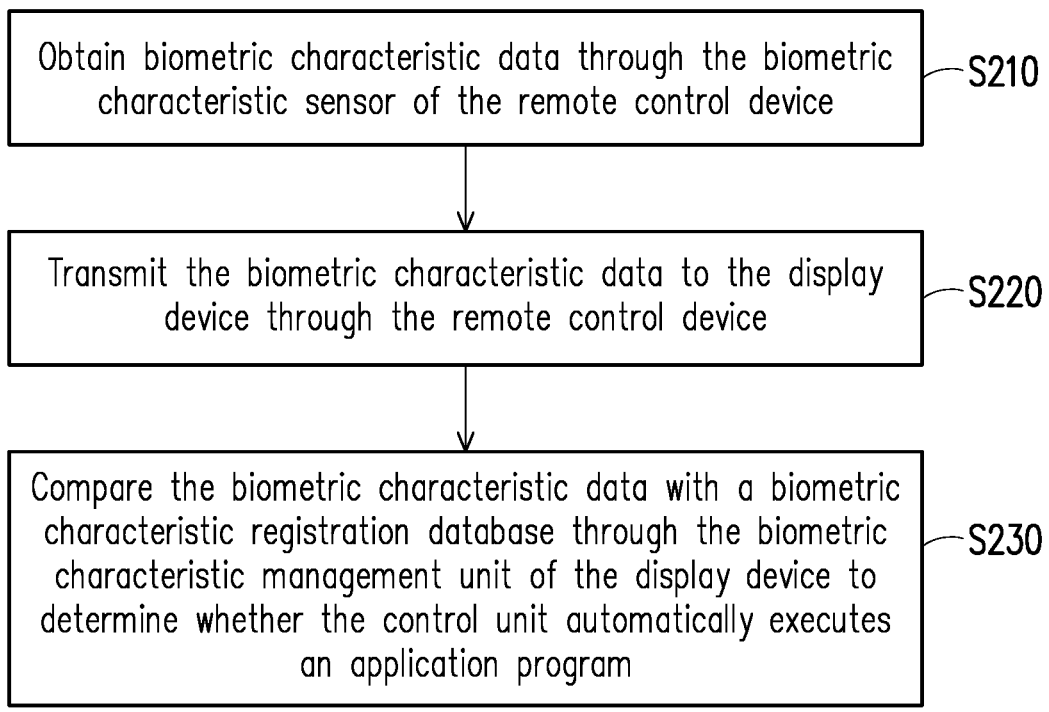
FIG. 2 is a flow chart of an operation method according to an embodiment of the disclosure.

FIG. 2 is a flow chart of an operation method according to an embodiment of the disclosure. Referring to FIGS. 1 and 2, the display system 100 may execute the following steps S210 to S230 to realize the function of identity verification and the function of remote-control of the display apparatus. In step S210, the display system 100 may obtain biometric characteristic data through the biometric characteristic sensor 111 of the remote-control device 110. In step S220, the display system 100 may transmit the biometric characteristic data to the display device 120 through the remote-control device 110 in an encrypted manner. In step S230, the display system 100 may compare the biometric characteristic data with a biometric characteristic registration database through the biometric characteristic management unit 123 of the display device 120 to determine whether the control unit 121 automatically executes an application program. The application program is, for example, a program for turning on, turning off, and adjusting the brightness of the display device 120, or a program for an audio-visual platform.

In this regard, when the display device 120 receives the biometric characteristic data provided by the remote-control device 110, the control unit 121 may enable the application program, and when the biometric characteristic data comparison is successful, the biometric characteristic management unit 123 may query the biometric characteristic registration database based on the biometric characteristic data to obtain account information corresponding to the biometric characteristic data. The control unit 121 may determine whether to automatically execute a specific operation of the application program according to the account information. In other words, the display system 100 of the disclosure allows the user to provide the biometric characteristic data by operating the remote-control device 110, so that the display device 120 may quickly compare and verify the biometric characteristic data of the current user. If the biometric characteristic data of the current user exists in the biometric characteristic registration database of the display device 120, the user may use the remote-control device 110 to provide control instructions to the display device 120, and then the display device 120 allows receiving the control instructions provided by the remote-control device 110 and quickly executes the specific operation of a specific application program of the display device 120, so as to provide a convenient remote-control function of the display system. In addition, the aforementioned specific operation may be an application program login operation (such as a specific audio-visual platform login) or a system setting operation (such as a display personalized setting).

In addition, in an embodiment, the biometric characteristic registration database may be stored in the display device 120, another terminal apparatus, or a cloud apparatus. For example, the display system 100 further includes a cloud server 130. The biometric characteristic registration database may be stored in the cloud server 130, and the display device 120 is connected to the cloud server 130 via wireless communication to store and read the biometric characteristic registration database. Alternatively, the display device 120 may transmit the biometric characteristic data to another terminal apparatus or a cloud apparatus to perform the biometric characteristic comparison and verification from the biometric characteristic registration database of said another terminal apparatus or cloud apparatus. When the comparison and verification are successful, said another terminal apparatus or cloud apparatus may transmit a confirmation instruction or a permission instruction to the display device 120, so that the display device 120 may follow the confirmation instruction or permission instruction and allow the user to use the remote-control device 110 to provide control instructions to the display device 120. Then, the display device 120 allows receiving the control instructions provided by the remote-control device 110 and automatically executes a specific application program or related display settings.

Figure 3:
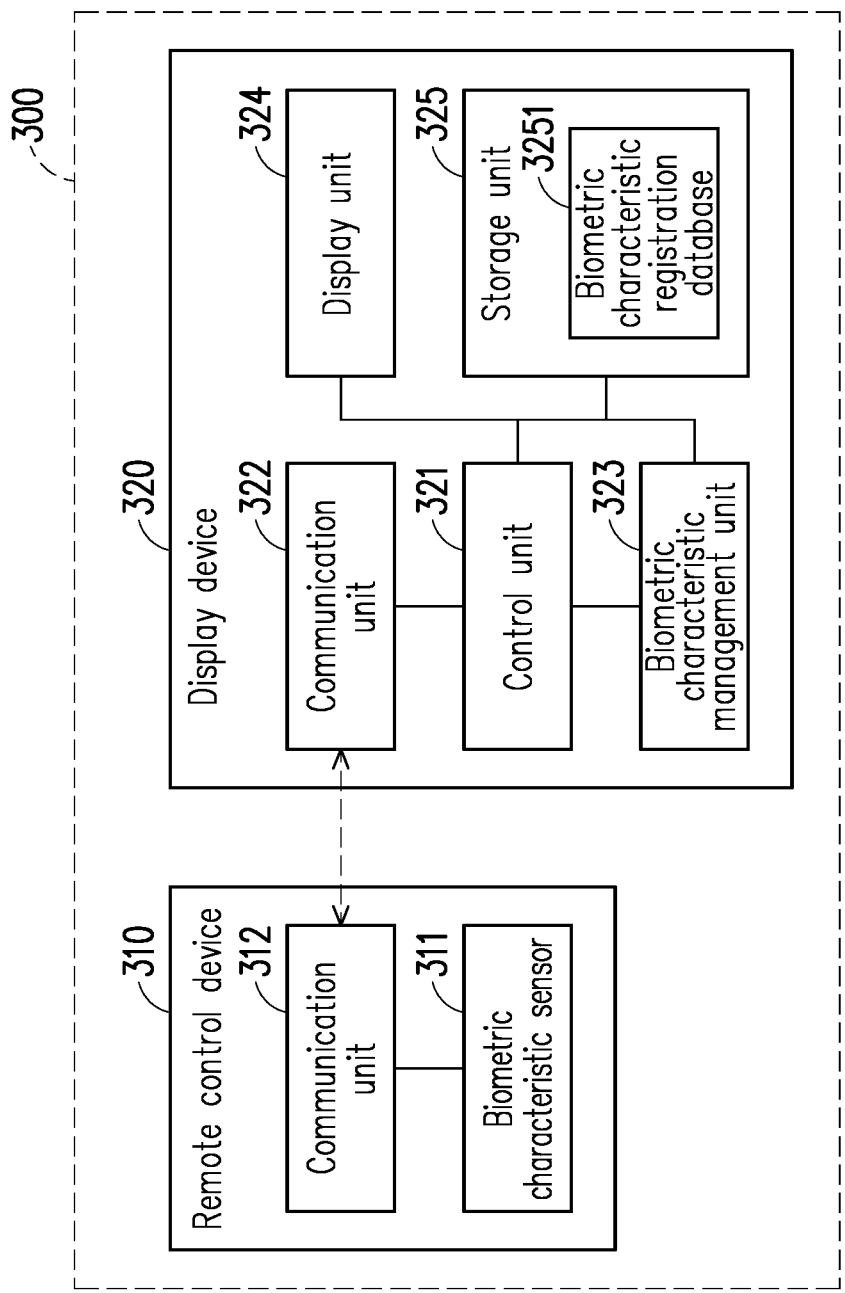
FIG. 3 is a schematic diagram of a display system according to another embodiment of the disclosure.

FIG. 3 is a schematic diagram of a display system according to another embodiment of the disclosure. Referring to FIG. 3, a display system 300 includes a remote-control device 310 and a display device 320. The remote-control device 310 includes a biometric characteristic sensor 311 and a communication unit 312. The biometric characteristic sensor 311 is coupled to the communication unit 312. The display device 320 includes a control unit 321, a communication unit 322, a biometric characteristic management unit 323, a display unit 324, and a storage unit 325. The control unit 321 is coupled to the communication unit 322, the biometric characteristic management unit 323, the display unit 324, and the storage unit 325. The biometric characteristic management unit 323 is coupled to the storage unit 325. In this embodiment, the remote-control device 310 may be connected to the communication unit 322 of the display device 320 through the communication unit 312 via wireless communication, so that the user may remotely control the display device 320 by operating the remote-control device 310 and transmit biometric characteristic data to the display device 320.

In this embodiment, the display device 320 is, for example, a projector, and the display unit 324 includes, for example, a related light source device, an optomechanical device, and a related drive circuit, but the disclosure is not limited thereto. In an embodiment, the display unit 324 may include a display element such as a display panel or a touch display panel. In this embodiment, the storage unit 325 is, for example, a removable random access memory (RAM), read-only memory (ROM), flash memory, or a similar element or a combination of the above elements, and the storage unit 325 may store a biometric characteristic registration database 3251, an application program and/or display setting parameters, etc., and may be read and/or stored by the control unit 321 and the biometric characteristic management unit 323. In this embodiment, the biometric characteristic registration database 3251 may store the relevant biometric characteristic data of the disclosure.

In addition, the description of the embodiments of FIG. 1 and FIG. 2 may be referred to for sufficient teachings, suggestions, and implementations of the implementation, functions, and operation methods of other devices and units of this embodiment, so details thereof will not be repeated herein.

Figure 4:
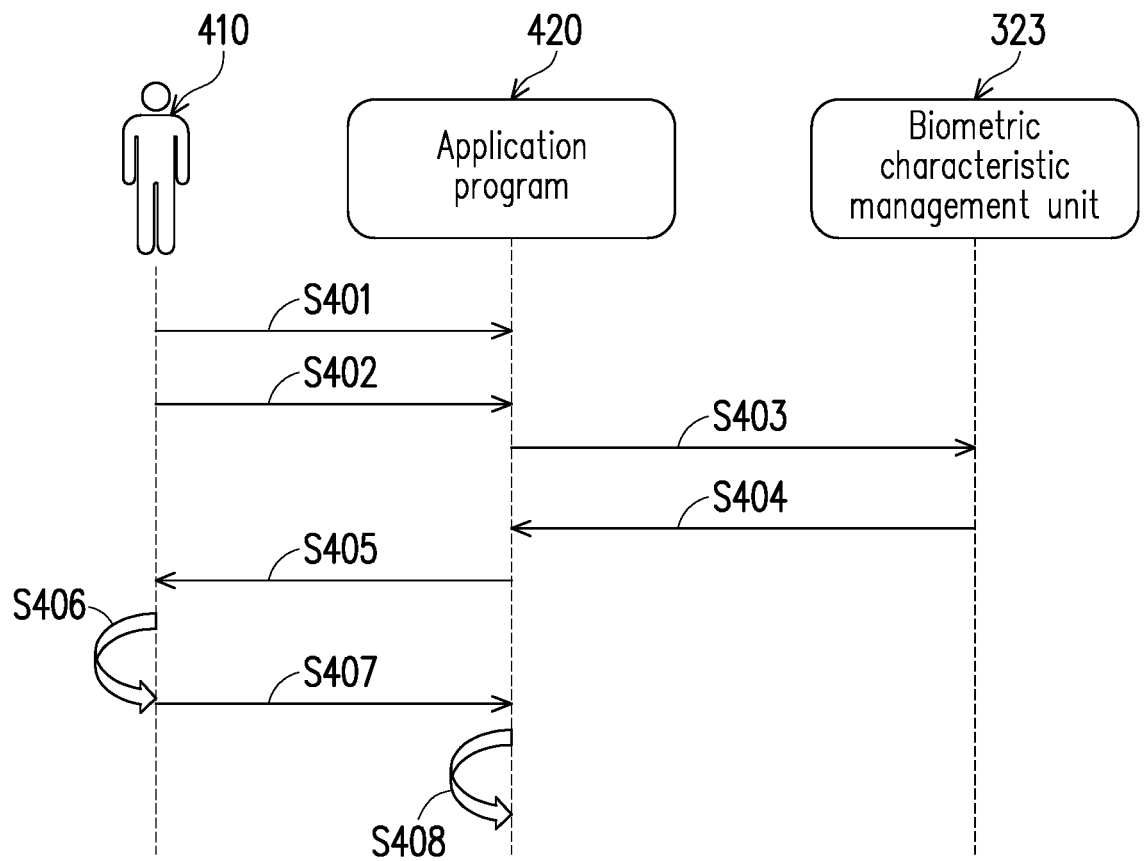
FIG. 4 is a flow chart of account binding according to an embodiment of the disclosure.

FIG. 4 is a flow chart of an account binding operation according to an embodiment of the disclosure. Referring to FIG. 3 and FIG. 4, the display system 300 may perform the following steps S401 to S408 to perform an account binding operation. In step S401, a user 410 may operate the remote-control device 310 to remotely control the display device 320, and enable an application program 420 of the display device 320. In step S402, the user 410 may operate the remote-control device 310 to create a personal account in the application program 420. In step S403, the application program 420 may query the biometric characteristic management unit 323 so that the biometric characteristic management unit 323 may access the biometric characteristic registration database 3251 in the storage unit 325 to query the biometric identification information through the application programming interface (API). In this embodiment, the application program 420 is, for example, a program that may support biometric identification functions, and the biometric characteristic registration database 3251 may pre-store the biometric characteristic registration data created by the user 410 through performing a biometric characteristic capturing operation in advance by using the biometric characteristic sensor 311 of the remote-control device 310, and the corresponding user account. For example, the user 410 may use the previously captured fingerprint characteristic data and the corresponding user account as the registration data in advance, and store the registration data in the biometric characteristic registration database 3251.

In step S404, the biometric characteristic management unit 323 may search the biometric characteristic registration database 3251, and return a biometric characteristic information list to the application program 420. The biometric characteristic information list may include, for example, a plurality of fingerprint characteristic data of the same or different users and the corresponding user account information. In step S405, the application program 420 may display the biometric characteristic information list through the display unit 324. In step S406, the user 410 may operate the remote-control device 310 to select a piece of biometric characteristic data from the biometric characteristic information list through the remote-control device 310. In step S407, the remote-control device 310 may transmit a confirmation signal to the display device 320. In step S408, the application program 420 may bind the selected biometric characteristic data with the user account of the application program 420 according to the confirmation signal. The control unit 321 may bind the biometric characteristic registration data with the specific operation of the application program 420 according to the selection result of the biometric characteristic information list.

Figure 5:
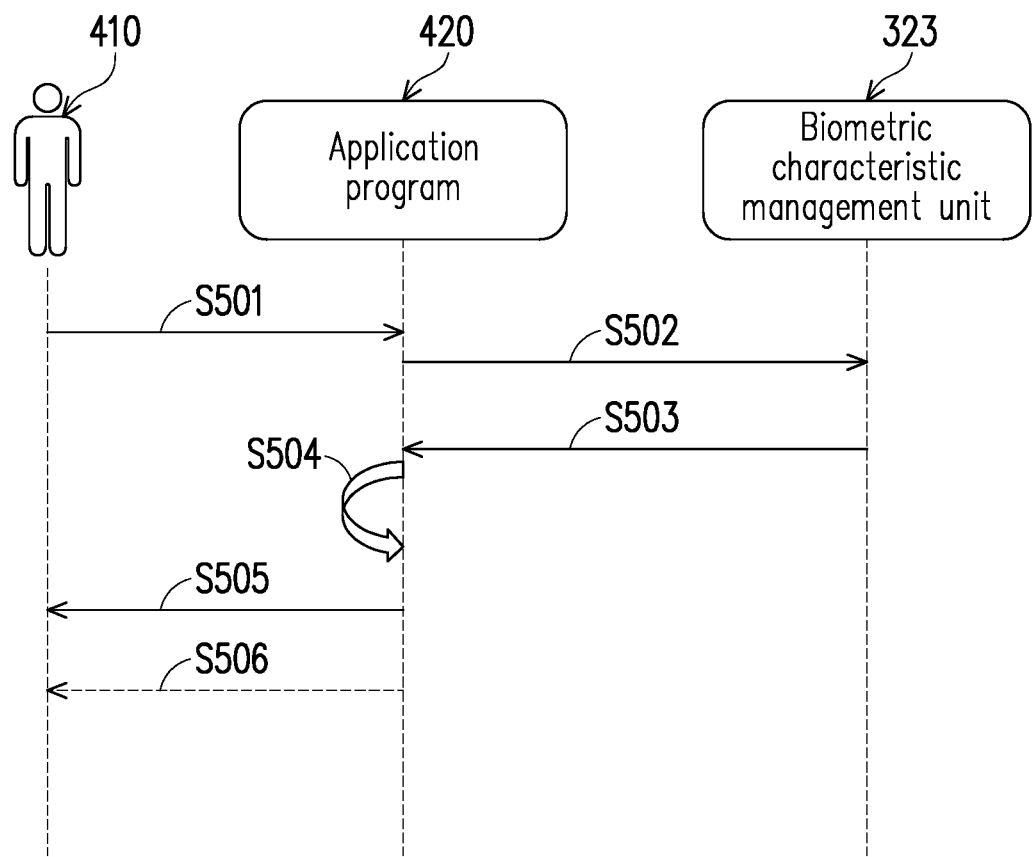
FIG. 5 is a flow chart of automatic account login according to an embodiment of the disclosure.

FIG. 5 is a flow chart of automatic account login according to an embodiment of the disclosure. Referring to FIG. 3 and FIG. 5, the display system 300 may perform the following steps S501 to S506 for account binding and automatic login. In this embodiment, before the display device 320 receives biometric characteristic data, the display device 320 may be operated in a shutdown mode, a standby mode or an awaiting login mode. In step S501, the user 410 may operate the remote-control device 310 to capture the biometric characteristic data through the biometric characteristic sensor 311, and transmit the biometric characteristic data to the communication unit 322 of the display device 320 through the communication unit 312. When the display device 320 receives the biometric characteristic data, the control unit 321 may automatically enable the display unit 324. In step S502, the application program 420 may query the biometric characteristic management unit 323 based on the biometric characteristic data, so that the biometric characteristic management unit 323 may access the biometric characteristic registration database 3251 in the storage unit 325 to query the biometric characteristic identification information through an application program interface. In step S503, the biometric characteristic management unit 323 may compare the biometric characteristic data with the biometric characteristic registration data in the biometric characteristic registration database 3251, and when the comparison is successful, the biometric characteristic management unit 323 may return the information that has passed the biometric characteristic verification to the application program 420. In step S504, the application program 420 may determine whether the biometric characteristic data that have passed the biometric verification are bound to a corresponding user account. If yes, in step S505, the application program 420 may execute a specific operation. For example, the display device 320 may log in to a specific video platform and display a specific video platform interface, or automatically load the system setting operation of the display device 320. If not, in step S506, the application program 420 may display the login screen through the display unit 324, and request the user 410 to provide the relevant login data by manual input instead.

In addition, in an embodiment, if the biometric characteristic data entered by the user are not bound to the user account of application program 420, when the display device 320 receives the biometric characteristic data, the control unit 321 may automatically enable the display unit 324, and the application program 420 may display the login screen through the display unit 324. In this regard, the user 410 may still use the biometric characteristic sensor 311 of the remote-control device 310 to perform the login operation of the application program 420 by means of biometric identification. Alternatively, in another embodiment, when the display device 320 receives the biometric characteristic data, the control unit 321 may automatically enable the display unit 324, and the application program 420 may choose to maintain the login status of the user account corresponding to the biometric characteristic data during the last login. In other words, the display device 320 does not need to perform the login operation every time, unless the user 410 logs out of the user account of the application program 420 last time.

In summary, the display system and the operation method thereof of the disclosure allow the user to operate the remote-control device for biometric sensing, and transmit the biometric characteristic data to the display device, so that the display device may perform biometric comparison. In addition, when the biometric comparison is successful, the display device may automatically execute the specific operation of the corresponding application program. Therefore, the display system and the operation method thereof of the disclosure may realize the functions of remote biometric verification and quick login to the application program of the display device.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display system, comprising:
   a display device, comprising a control unit and a biometric characteristic management unit, wherein the control unit is coupled to the biometric characteristic management unit;
   a biometric characteristic registration database, configured to store biometric characteristic registration data and at least one user account information of an application program; and
   a remote-control device, comprising a biometric characteristic sensor, configured to connect to the display device via wireless communication,
   wherein the biometric characteristic sensor of the remote-control device is configured to obtain biometric characteristic data, and
   the remote-control device is configured to transmit the biometric characteristic data to the display device,
   the biometric characteristic management unit of the display device is configured to compare the biometric characteristic data with the biometric characteristic registration data in the biometric characteristic registration database, wherein
   in response to a comparison between the biometric characteristic data and the biometric registration data is successful and the biometric characteristic data is bound to the at least one user account information of the application program, the control unit automatically executes a specific operation of the application program according to the at least one user account information; and
   in response to the comparison between the biometric characteristic data and the biometric registration data is successful and the biometric characteristic data is not bound to the at least one user account information of the application program, the control unit controls the display device to display a login screen of the application program to allow manual input relevant to an user account information of the application program.

2. The display system according to claim 1, wherein when the display device receives the biometric characteristic data, the control unit enables the application program.

3. The display system according to claim 1, wherein the specific operation at least comprises a login operation of the application program.

4. The display system according to claim 1, wherein the control unit presets and executes the application program to establish the at least one user account information for storing the at least one user account information of the application program to the biometric characteristic registration database, and wherein the biometric characteristic management unit is configured to search the biometric characteristic registration database for transmitting a biometric characteristic information list, and the biometric characteristic information list comprises the biometric characteristic registration data and the at least one user account information, and the remote-control device is configured to select one of the biometric characteristic registration data from the biometric characteristic information list, and the control unit is configured to bind the selected one of the biometric characteristic registration data to the at least one user account information of the application program.

5. The display system according to claim 1, wherein the biometric characteristic registration database is stored in a cloud server, and the display device is configured to connect to the cloud server via wireless communication to access the biometric characteristic registration database.

6. The display system according to claim 1, wherein the display device further comprises a storage unit, and the storage unit is coupled to the control unit and the biometric characteristic management unit, and configured to stores the biometric characteristic registration database.

7. The display system according to claim 1, wherein before the display device receives the biometric characteristic data, the display device is in a shutdown mode, a standby mode, or an awaiting login mode.

8. The display system according to claim 1, wherein the remote-control device is configured to encrypt the biometric characteristic data, and transmit the biometric characteristic data that is encrypted to the display device.

9. The display system according to claim 1, wherein the display device is a projector, a TV, or a touch display, and wherein the biometric characteristic data and the biometric characteristic registration data are fingerprint characteristic data.

10. An operation method of a display system, wherein the display system comprises a display device, a biometric characteristic registration database configured to store biometric characteristic registration data and at least one user account information of an application program, and a remote-control device, the display device comprises a control unit and a biometric characteristic management unit, the remote-control device comprises a biometric characteristic sensor, wherein the operation method comprises:

obtaining biometric characteristic data through the biometric characteristic sensor of the remote-control device;

transmitting the biometric characteristic data to the display device through the remote-control device; and comparing the biometric characteristic data with the biometric characteristic registration data in the biometric characteristic registration database through the biometric characteristic management unit of the display device, wherein in response to a comparison between the biometric characteristic data and the biometric registration data is successful and the biometric characteristic data is bound to the at least one user account information of the application program, automatically executing, by the control unit, a specific operation of the application program according to the at least one user account information; and in response to the comparison between the biometric characteristic data and the biometric registration data is successful and the biometric characteristic data is not bound to the at least one user account information of the application program, controlling, by the control unit, the display device to display a login screen of the application program to allow manual input relevant to an user account information of the application program.

11. The operation method according to claim 10, further comprising:

enabling the application program through the control unit when the display device receives the biometric characteristic data.

12. The operation method according to claim 11, wherein the specific operation at least comprises a login operation of the application program.

13. The operation method according to claim 11, further comprising:

presetting and executing the application program through the control unit to create at least one user account information; and storing the at least one user account information of the application program to the biometric characteristic registration database.

14. The operation method according to claim 10, wherein the biometric characteristic registration database is stored in a cloud server, and the display device is configured to connect to the cloud server via wireless communication to access the biometric characteristic registration database.

15. The operation method according to claim 10, wherein the display device further comprises a storage unit, and the storage unit is coupled to the control unit and the biometric characteristic management unit, and stores the biometric characteristic registration database.

16. The operation method according to claim 10, wherein before the display device receives the biometric characteristic data, the display device is in a shutdown mode, a standby mode, or an awaiting login mode.

17. The operation method according to claim 10, wherein the remote-control device encrypts the biometric characteristic data, and transmits the biometric characteristic data that is encrypted to the display device.

18. The operation method according to claim 10, wherein the display device is a projector, a TV, or a touch display, and wherein the biometric characteristic data and the biometric characteristic registration data are fingerprint characteristic data.

* * * * *